March 17, 1953 — H. E. KREFFT — 2,632,033

SEAL FOR ELECTRICAL DISCHARGE DEVICES

Filed July 19, 1949 — 3 Sheets-Sheet 1

INVENTOR.
HERMANN EDUARD KREFFT
BY
ATTORNEY

March 17, 1953 H. E. KREFFT 2,632,033
SEAL FOR ELECTRICAL DISCHARGE DEVICES
Filed July 19, 1949 3 Sheets-Sheet 2
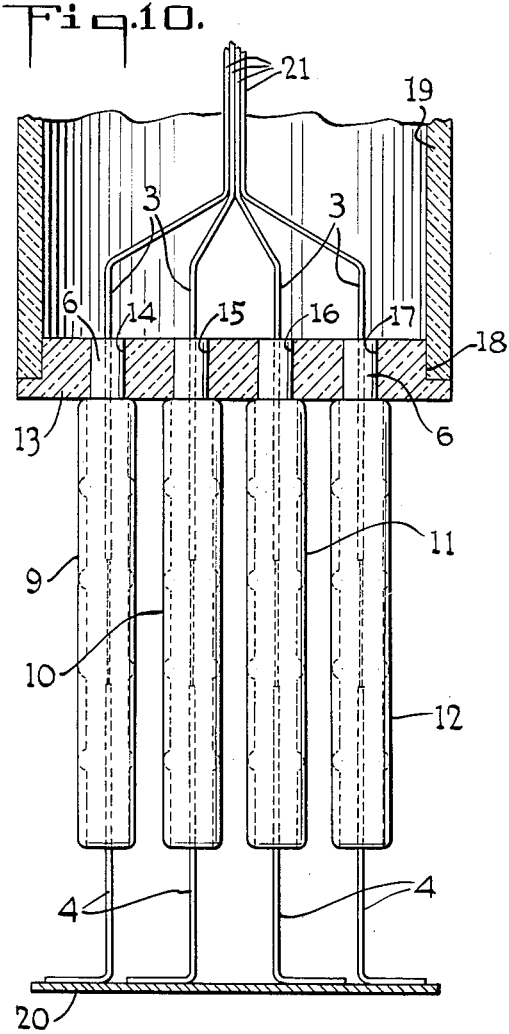
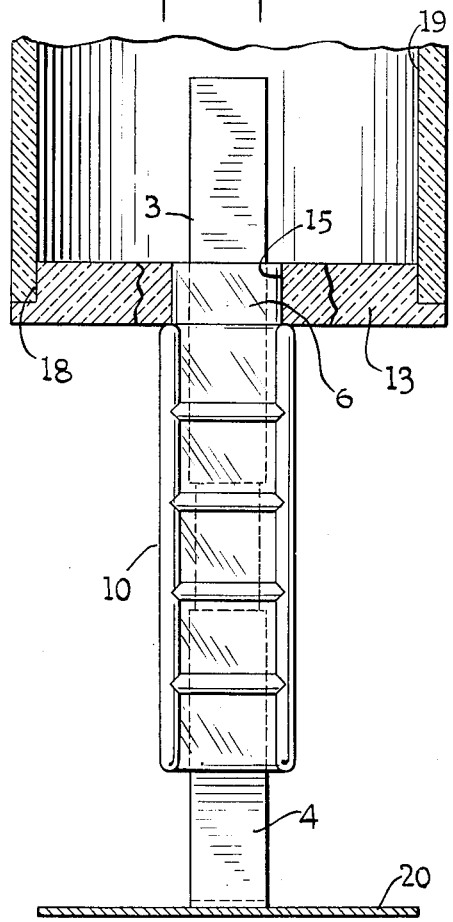
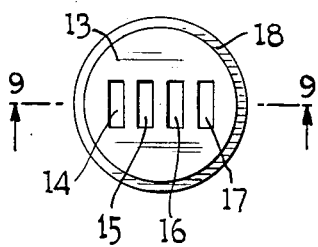
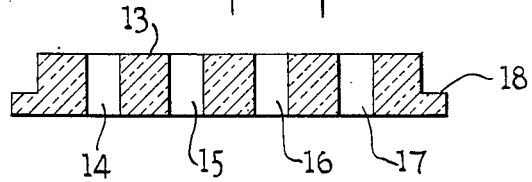
INVENTOR.
HERMANN EDUARD KREFFT
BY
ATTORNEY March 17, 1953 H. E. KREFFT 2,632,033
SEAL FOR ELECTRICAL DISCHARGE DEVICES
Filed July 19, 1949 3 Sheets-Sheet 3
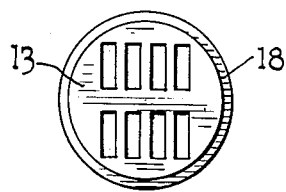
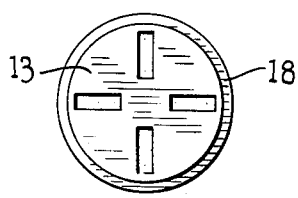
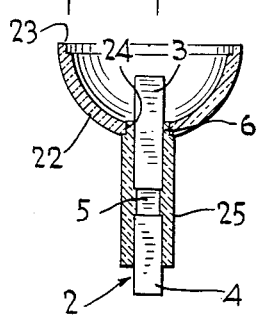
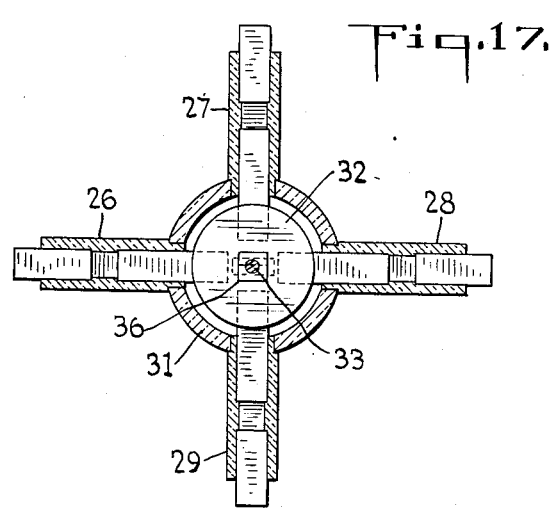
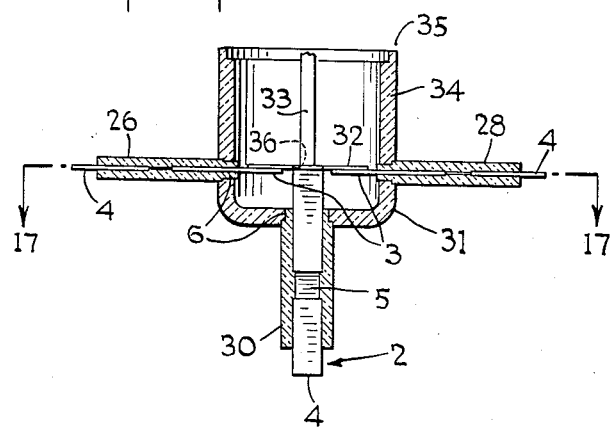
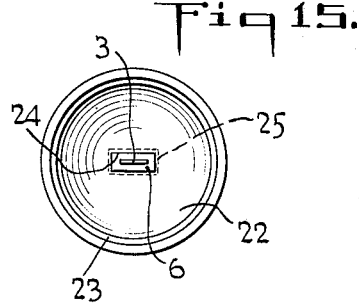
INVENTOR.
HERMANN EDUARD KREFFT
BY
ATTORNEY Patented Mar. 17, 1953

2,632,033

UNITED STATES PATENT OFFICE 2,632,033

SEAL FOR ELECTRICAL DISCHARGE DEVICES

Hermann Eduard Krefft, Buenos Aires-Belgrano, Argentina

Application July 19, 1949, Serial No. 105,525

5 Claims. (Cl. 174—50.64)

The present invention relates to a seal for electrical discharge devices and particularly to a seal for high pressure discharge lamps.

In the field of electrical discharge lamps, the seal between leading-in conductors and a glass envelope, e. g. the neck portion of a glass envelope, is usually provided by heating the glass and pressing the heated glass to the conductors. Such sealing, which is generally accomplished in the presence of an oxidizing atmosphere, causes considerable weakening of the seals, does not provide a seal strong enough to withstand the high operating temperatures of high pressure lamps, lacks uniformity and consumes considerable time in lamp assembly. Although this type of seal may not be particularly disadvantageous for ordinary lamps, it is not desirable for high pressure or super high pressure lamps especially with regard to the maintenance of desired lamp characteristics and mechanical strength.

Figure 1:
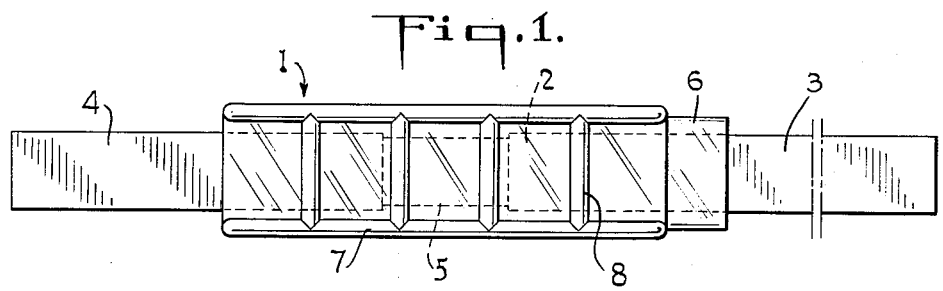
Figure 2:
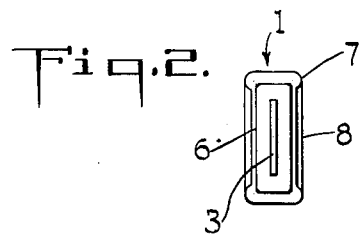
Figure 3:
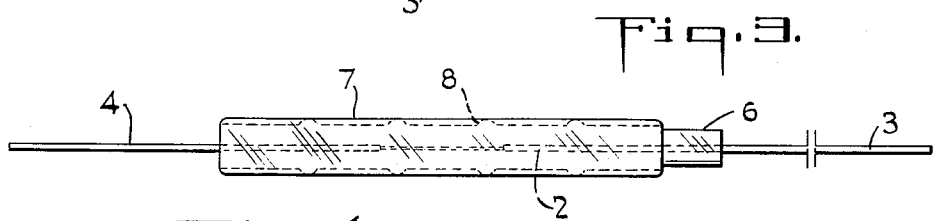
Figure 4:
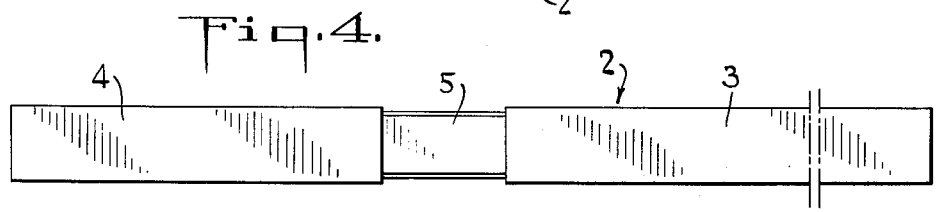
Figure 5:
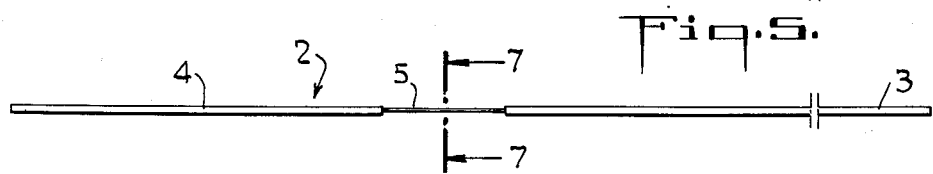
Figure 6:
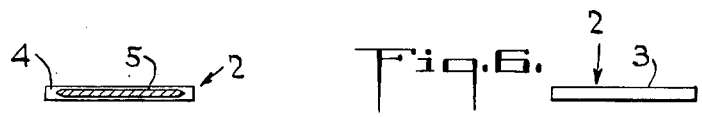
Figure 7:
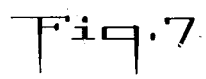

It is one object of the present invention to provide electrical discharge devices with a glass to metal seal component or element which can be manufactured economically and in large quantities. It is another object of the present invention to provide electrical discharge lamps with a glass to metal seal element of accurate dimensions which can be easily welded to other glass parts. It is a further object of the present invention to provide electrical discharge devices with a glass to metal seal element and supporting structure therefor and which is adapted for use with an electrical conductor of high current carrying capacity. Other objects and advantages of the present invention will become apparent from the description hereinafter following and the drawings forming part hereof in which:

Figures 1, 2 and 3 illustrate top, end and side views respectively of a seal element according to the invention, Figure 4 illustrates an enlarged top view of a metallic conductor forming part of the seal element, Figures 5 and 6 illustrate a longitudinal sectional view and an end view respectively of Figure 4, Figure 7 is a cross-sectional view taken along the line 7—7 of Figure 5, Figure 8 illustrates a slotted disc shaped glass support for the seal elements of the present invention, Figure 9 is a cross-sectional view taken along the line 9—9 of Figure 8, Figure 10 is a cross-sectional view of a seal according to the invention in assembled position, Figure 11 illustrates another view of a single seal element of Figure 10, and Figures 12-17, inclusive, illustrate various modifications of seal arrangements according to the invention.

According to the present invention, a glass seal and particularly a quartz glass seal of high current capacity is formed from a plurality of molded seal elements welded to a molded quartz glass assembling disc or cylinder which is provided with slots or bores into which the seal elements are welded. All these molded parts possess definite and accurate dimensions produced by the process of molding and additional mechanical working methods hereinafter more particularly described, and they are made to fit into each other precisely. In this manner, a seal with high current capacity is easily assembled and welded to form a uniform body of great mechanical strength which will stand very high temperatures as required in super high pressure lamps.

Some seal constructions, which are made according to the invention, are contained in the drawings which show by way of example different types of high current seals and the elements of which they are composed.

Figure 1 shows a seal element consisting of a quartz glass body 1 and a metallic conductor 2 which is sealed into the quartz glass. This conductor consists preferably of an elongated molybdenum strip of which the central part is imbedded in the quartz body, while the ends 3 and 4 are left bare to serve as leading-in conductors to and from the seal. The position of the conductor in the seal element, and its flat shape are illustrated by Figures 2 and 3. As shown in Figure 4, the molybdenum strip contains a section 5 of considerably reduced thickness as illustrated by the sectional views in Figures 5 and 7. Such reduced section may be produced in the strip by etching or by mechanical means, etc. Preferably, the strip has a thickness of 0.1 millimeter and more, while the thickness in the section 5 may be reduced to considerably less than 0.1 millimeter. The width of the strip is from about 4 millimeters to 12 millimeters. When preparing the strip care must be taken that its edges, at least in the section 5, are wedge-shaped as indicated in Figure 7. This shape serves to improve conditions for a perfect seal between the quartz glass and the molybdenum strip in the section 5. One method of producing this seal consists in pressing, by means of two jaws, a heated quartz glass tube onto the conductor which is previously introduced into the tube. It is convenient to use a flattened tube adapted to the shape of the strip. The jaws used for pressing and molding the seal element are given a precise shape corresponding to the desired shape of the element. For example, the jaws themselves form part of the burners required for heating the quartz glass during the molding process. During this process, the strip is protected against oxidation by an atmosphere of nitrogen, helium, or argon, to which some hydrogen can be added.

The jaws used for pressing and molding the seal element possess a convenient shape so that one end of the quartz glass body forms a plug 6 which is used for welding the seal element to other quartz glass parts. The jaws are also shaped to limit the length of the quartz glass body by cutting rims where the quartz glass material can be easily broken off without damaging the flexible strip after the seal element is finished. In order to increase the mechanical strength of the seal element without using too much quartz glass, ribs 7 and 8 are produced on the surface of the quartz glass body of the seal element during the process of pressing and molding. This may be accomplished by a single operation in the pressing and molding process since the jaws used for molding and pressing are provided with grooves corresponding to the ribs 7 and 8.

Such seal elements can be produced by machines in a continuous process and in large numbers and, obviously, with identical shapes and dimensions. Preferably, the plug 6 of the seal element is given its final, and very accurate, shape, by grinding its surface with a Carborundum or diamond studded disc.

As the dimensions of the strip, particularly the section 5, cannot be made too large for practical reasons, and since an upper limit exists above which a vacuum tight seal cannot be securely obtained, the capacity of a seal element as described preferably does not exceed a current of about 20 amperes. For higher currents, therefore, a plurality of such seal elements must be used.

The construction of a seal for high currents, according to the invention, is illustrated by Figures 8, 9, 10 and 11. Figure 10 is a cross-sectional view of such a seal welded to the neck of a lamp container, and Figure 11 is a side view of the same seal. Figure 10 shows four seal elements 9, 10, 11, and 12, welded to a disc 13 the construction of which is illustrated by the views of Figures 8 and 9. The disc consists of molded quartz glass which is pressed in a form of suitable shape producing slots 14, 15, 16, 17 and a rim 18, as shown in Figures 8 and 9. The slots correspond in dimensions to the plugs 6 of the seal elements, and the rim 18 has a suitable profile which serves for welding the disc 13 onto the neck 19 of the lamp container which has a profile corresponding to the periphery of the disc 13, as shown in Figures 10 and 11. If the slots in the disc are not sufficiently precise for an accurate fit of the plugs 6 of the seal elements, they are given definite dimensions by mechanical working methods, e. g. grinding. In this case, it is convenient to compose the disc 13 of two halves, as indicated by the line 9—9 in Figure 8 because the grinding tool can be applied more readily to an open slot. When all parts are perfectly shaped in this way, four seal elements and a disc, or the two halves of the disc, are assembled to form the seal construction illustrated in Figures 10 and 11. The seal element and support therefor, e. g. disc 13, are welded together in an electrical furnace under a non-oxidizing atmosphere. After this process, the rim 18 of the disc 13 is preferably given a final shape by grinding and the free ends 3 and 4, respectively, of the seal elements are connected to each other, as shown in Figure 10, to form one main conductor 20 on the outside, and one main conductor 21 on the inside of the seal. The seal now forms one solid unit which can be supplied with an electrode according to the desired construction of the lamp. When the seal is welded onto the lamp neck, e. g. neck 19, which is done under a non-oxidizing atmosphere in an electrical furnace or by means of hydrogen-oxygen burners applied to the rim and the adjoining parts of the seal and the lamp neck, the weld between the seal elements and the disc is brought to a final state, and at the same time possible tensions existing in the quartz glass body are definitely removed.

In a similar manner, and according to the invention, seals for high currents are composed of a smaller or larger number of seal elements which can be arranged geometrically in various patterns. As shown by Figure 12, a seal of high current capacity may contain eight such elements forming two parallel groups of four conductors each; or four conductors or seal elements are arranged radially, as shown in Figure 13. In both cases, the seal elements are welded to a molded quartz glass disc similar to that previously shown, and finally the individual conductors are connected to each other to form a seal of high capacity.

Instead of a flat disc a differently shaped body can be used to carry the seal elements, for instance a half sphere, as illustrated by Figures 14 and 15, where a semi-spherical seal containing one conductor only is shown. It consists of a semi-sphere 22 of molded quartz glass which has a rim profile 23, and a slot 24 fitting the plug 6 of the seal element 25. Owing to the spherical shape this seal has high mechanical strength, and it may be welded, by means of the rim 23, to the neck of a quartz glass container, or two seals of this kind, possessing rim profiles fitting into each other, are welded together directly after the electrodes have been mounted to form a spherical super high pressure lamp of comparatively small size and wattage.

It is not essential that the plugs 6 of the seal elements be given a rectangular sectional shape, as indicated in the drawings since these parts may also be cylindrical or conical. Such shape is preferably chosen when round wires or rod are welded to the seal conductor strips, and form part of the seal elements imbedded in the quartz glass.

In another embodiment of my invention, the seal elements forming a part of a high current seal are arranged radially in one plane, and not parallel to each other, as illustrated in Figures 16 and 17, which demonstrate a seal with four radial seal elements to which is added a fifth seal element sealed in the manner previously described. With reference to Figures 16 and 17, the supporting element for the individual seal elements 26, 27, 28, 29 and 30, is a low cylinder which is preferably closed on one end, and forms a cup 31 made of molded quartz glass. The seal elements are welded into the sides of this cup as shown in the drawings by means of slots contained in the side walls into which the plugs 6 of the seal elements fit accurately. The inside ends 3 of the seal conductors are welded to a metallic disc 32 which carries the electrode support rod 33. This supporting element may also consist of molybdenum sheet bent to form a convenient structure. The seal shown in Figure 16 is provided with an additional seal element 30 welded to the bottom of the cup 31 which possesses in its flat part a slot fitting the plug of this seal element. Preferably, the seal comprises also a cylindrical molded part 34 provided with a shaped rim 35 which serves to weld the seal to the lamp container. The slots required for the radial seal elements can be contained partly in this cylindrical part 34. The construction of this seal is more completely illustrated in Figure 17 which is a transverse sectional view of the same seal taken on the line 17—17 of Figure 16.

The manufacture of this seal comprises the steps of assembling the seal elements 26, 27, 28 and 29 by welding their ends 3 to the metallic disc 32 which may consist of molybdenum sheet. Thus, a firm structure is formed which fits precisely with the plugs 6 into the slots molded and ground into the side wall of the cup 31. The seal element 30 is then fitted into the slot contained in the bottom of the cup and the end 3 of its conductor is also firmly attached to the disc 32 which has a narrow slot 36 through which this end is passed, thus making it accessible for welding to the disc. Finally, the molded cylinder 34 is added and the complete seal assembly welded in an electrical furnace, under a non-oxidizing atmosphere to form a firm structure, as described.

While the example shown in Figures 16 and 17 contains five seal elements, it is obvious that their number, both of the radial elements and of the elements welded to the bottom, may be different. The seal elements welded to the side wall can also have a different arrangement with the conductor strips turned around by 90 degrees and with the foils parallel to the cylinder axis, thus allowing space for a larger number of seal elements.

My invention is not restricted to seals supplying one electrode only since the seal elements can be used separately, or in groups to supply a plurality of electrodes according to the needs resulting from lamp construction which is often of a type utilizing more than one electrode pair. In such cases where the individual conductors of the seal are not mechanically connected to each other, electrical communication and coordination is produced by the discharge arcs of the lamp which form jointly a system energized by high current carried by the seal.

What I claim is:

1. A vacuum tight seal structure of high current carrying capacity for high pressure electrical discharge devices comprising in combination a plurality of molded quartz glass seal elements each consisting of a thin electrical lead-in conductor strip having a longitudinal portion thereof sealed in a substantially flat and elongated quartz glass body, the end portions of each of said strips being exposed, and a molded quartz glass cap engageable with the walls of an opening in a discharge device glass envelope, said cap having a plurality of apertures formed therethrough and an end portion only of each of said glass bodies being seated in each of said apertures for glass to glass welding to said glass cap, said glass cap having a peripheral seating rim engageable with said envelope for positioning said cap in said opening for glass to glass welding for sealing said opening, a pair of main conductors for said seal structure, the ends of said thin conductors on each side of said cap being electrically connected to one of said main conductors.

2. A vacuum seal structure according to claim 1, wherein the end portions of said thin conductors are combined on each side of said cap to form said main conductors.

3. A vacuum tight seal structure of high current carrying capacity for high pressure electrical discharge devices comprising in combination a plurality of molded quartz glass seal elements each consisting of a thin electrical lead-in conductor strip having a longitudinal portion thereof sealed in a substantially flat and elongated quartz glass body, the end portions of each of said strips being exposed, said quartz glass body having a ribbed surface, and a molded quartz glass cap engageable with the walls of an opening in a discharge device quartz glass envelope, said cap having a plurality of apertures formed therethrough and an end portion only of each of said quartz glass bodies being seated in each of said apertures for glass to glass welding to said cap, said cap consisting of a disc having a peripheral seating rim engageable with said envelope for positioning said disc in said opening for glass to glass welding for sealing said opening, a pair of main conductors for said seal structure, the ends of said thin conductors on each side of said cap being electrically connected to one of said main conductors.

4. A quartz glass seal structure according to claim 3 wherein each of said apertures is in the form of a slot in said disc, said glass body having a reduced end portion in the form of a plug insertably engageable with said slot.

5. A vacuum tight seal structure of high current carrying capacity for high pressure electrical discharge devices comprising in combination a plurality of molded quartz glass seal elements each consisting of a thin electrical lead-in conductor strip having a longitudinal portion thereof sealed in a substantially flat and elongated quartz glass body, the end portions of each of said strips being exposed, and a molded quartz glass cap engageable with the walls of an opening in a discharge device quartz glass envelope, said cap having a plurality of apertures formed therethrough and an end portion only of each of said quartz glass bodies being insertably seated in each of said apertures for glass to glass welding to said cap, said cap consisting of a molded cup with a low cylindrical wall having a peripheral seating rim engageable with said envelope for positioning said cap on said envelope for glass to glass welding for sealing said opening, a pair of main conductors for said seal structure, the ends of said thin conductors on each side of said cap being electrically connected to one of said main conductors.

HERMANN EDUARD KREFFT.

REFERENCES CITED

The following references are of record in the file of this patent:

UNITED STATES PATENTS

| Number | Name | Date |
| --- | --- | --- |
| 1,271,245 | Von Recklinghausen | July 2, 1918 |
| 2,177,685 | Bol et al. | Oct. 31, 1939 |
| 2,231,459 | Anderson | Feb. 11, 1941 |
| 2,339,850 | Goodale | Jan. 25, 1944 |
| 2,400,946 | Nelson et al. | May 28, 1946 |

FOREIGN PATENTS

| Number | Country | Date |
| --- | --- | --- |
| 22,911A | Great Britain | Oct. 15, 1906 |
| 28,935 | Great Britain | Dec. 15, 1913 |
| 476,488 | Great Britain | Dec. 6, 1937 |